United States Patent
Garrick et al.

(10) Patent No.: US 12,435,975 B2
(45) Date of Patent: Oct. 7, 2025

(54) MEASUREMENT SYSTEM AND METHOD FOR AN ENERGY CELL

(71) Applicant: GM GLOBAL TECHNOLOGY OPERATIONS LLC, Detroit, MI (US)

(72) Inventors: Taylor R. Garrick, Bloomfield Hills, MI (US); Miguel A. Fernandez, Saint Claire Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 18/360,896

(22) Filed: Jul. 28, 2023

(65) Prior Publication Data

US 2025/0035439 A1   Jan. 30, 2025

(51) Int. Cl.
*G01B 21/02* (2006.01)
*H02J 7/00* (2006.01)

(52) U.S. Cl.
CPC ............ *G01B 21/02* (2013.01); *H02J 7/0068* (2013.01)

(58) Field of Classification Search
CPC ....... G01B 21/02; G01B 21/00; H02J 7/0068; Y02E 60/10; G01R 31/385
See application file for complete search history.

(56) References Cited

U.S. PATENT DOCUMENTS 5,567,541 A * 10/1996 Rouhani ............. H01M 6/5044
429/93

\* cited by examiner

*Primary Examiner* — Xin Y Zhong
(74) *Attorney, Agent, or Firm* — Quinn IP Law

(57) ABSTRACT

A system for measuring a dimension of an energy cell includes a wire cable, a tensioning system, and a measurement system. The wire cable includes a first end and a second end, and is disposable about an outer periphery of an energy cell. The tensioning system includes a first tensioner attached to a first end of the wire cable and a second tensioner attached to a second end of the wire cable. The measurement system includes a first linear displacement transducer and a second linear displacement transducer that are in communication with a controller. The first linear displacement transducer is connected to the first tensioner, and the second linear displacement transducer is connected to the second tensioner. The measurement system is operative to determine a dimensional parameter of the energy cell.

20 Claims, 3 Drawing Sheets

MEASUREMENT SYSTEM AND METHOD FOR AN ENERGY CELL

INTRODUCTION

Energy cells such as rechargeable electrochemical battery cells are cyclically charged and discharged over the course of their service life. The energy cells may experience volumetric change during the cyclical charging/discharging events. Some of the volumetric change during the cyclical charging/discharging events may be reversible, and some of the volumetric change during the cyclical charging/discharging events may be irreversible.

SUMMARY

There is a need for a system, apparatus, and/or an associated method for measuring or otherwise determining dimensional parameters of a rechargeable energy cell during cyclical charging/discharging events.

A system for measuring a dimension of an energy cell is described, and includes a wire cable, a tensioning system, and a measurement system. The wire cable includes a first end and a second end, and is disposable about an outer periphery of an energy cell. The tensioning system includes a first tensioner attached to the first end of the wire cable and a second tensioner attached to a second end of the wire cable. The measurement system includes a first linear displacement transducer and a second linear displacement transducer that are in communication with a controller. The first linear displacement transducer is connected to the first tensioner, and the second linear displacement transducer is connected to the second tensioner. The measurement system is operative to determine a dimensional parameter of the energy cell.

Another aspect of the disclosure may include the measurement system being operative to determine a length of the outer periphery of the energy cell.

Another aspect of the disclosure may include a charge cycling system; wherein the charge cycling system is connectable to the energy cell.

Another aspect of the disclosure may include the charge cycling system being operative to execute a charge/discharge cycle on the energy cell; and the measurement system being operative to determine the dimensional parameter of the outer periphery of the energy cell coincident with the charge cycling system executing the charge/discharge cycle on the energy cell.

Another aspect of the disclosure may include the energy cell having a cylindrical configuration; wherein the measurement system is operative to determine a circumference of the energy cell based upon a linear displacement of the wire cable that is determined via the first linear displacement transducer and the second linear displacement transducer.

Another aspect of the disclosure may include the measurement system being operative to determine a first circumference of the energy cell at a 0% state of charge (SOC) point; determine a second circumference of the energy cell at a second SOC point; and determine difference between the first circumference and the second circumference.

Another aspect of the disclosure may include the tensioner system being arranged such that the first tensioner is arranged to exert a tensile force via the first end of the wire cable at a tangent to the energy cell and the second tensioner is arranged to exert a tensile force via the second end of the wire cable at a tangent to the energy cell when the wire cable is disposed around the outer periphery of the energy cell.

Another aspect of the disclosure may include the energy cell defining an elevation axis; and the tensioning system being arrangeable on the energy cell at a z-height, wherein the z-height is definable relative to the elevation axis.

Another aspect of the disclosure may include the wire cable being fabricated from a nickel-iron alloy, including an invar alloy.

Another aspect of the disclosure may include the wire cable being loopable around the outer periphery of the energy cell.

Another aspect of the disclosure may include a system for an energy cell that includes a tensioning system including a wire cable, a measurement system, and a charge cycling system arranged in a thermally stable environment; wherein the wire cable is disposable about an outer periphery of an energy cell; wherein the tensioning system includes a first tensioner attached to a first end of the wire cable and a second tensioner attached to a second end of the wire cable; wherein the measurement system includes a first linear displacement transducer and a second linear displacement transducer in communication with a controller; wherein the charge cycling system is connectable to the energy cell; and wherein the first linear displacement transducer is connected to the first tensioner, and wherein the second linear displacement transducer is connected to the second tensioner.

Another aspect of the disclosure may include the measurement system being operative to determine a length of the outer periphery of the energy cell that corresponds to a dimensional parameter of the energy cell.

Another aspect of the disclosure may include the charge cycling system being operative to execute a charge/discharge cycle on the energy cell; and the measurement system being operative to determine the dimensional parameter of the outer periphery of the energy cell coincident with the charge cycling system executing the charge/discharge cycle on the energy cell.

Another aspect of the disclosure may include the energy cell having a cylindrical configuration, wherein the measurement system is operative to determine a circumference of the energy cell based upon a linear displacement of the wire cable that is determined via the first linear displacement transducer and the second linear displacement transducer.

Another aspect of the disclosure may include the measurement system being operative to determine a first circumference of the energy cell at a 0% state of charge (SOC) point; determine a second circumference of the energy cell at a second SOC point; and determine a difference between the first circumference and the second circumference.

Another aspect of the disclosure may include the energy cell defining an elevation axis; and the tensioning system being arrangeable on the energy cell at a z-height, wherein the z-height is definable relative to the elevation axis.

Another aspect of the disclosure may include a method for monitoring a dimensional parameter for an energy cell, including: securing an energy cell into a fixture that is arranged in a thermally stable environment; arranging a wire cable in a loop around an outer periphery of the energy cell; attaching the wire cable to a base of a tensioning system; attaching the base of the tensioning system to a measurement system; and executing, via a charge cycling system, a charge/discharge cycle on the energy cell and coincidently monitoring, via the measurement system, a dimensional parameter of the outer periphery of the energy cell.

Another aspect of the disclosure may include determining a reversible change of the dimensional parameter of the outer periphery of the energy cell during execution of the charge/discharge cycle on the energy cell; and determining an irreversible change of the dimensional parameter of the outer periphery of the energy cell during execution of the charge/discharge cycle on the energy cell.

Another aspect of the disclosure may include determining an intercalation induced volume change for the energy cell based upon the reversible change of the dimensional parameter of the outer periphery of the energy cell; and determining a side reaction induced volume change based upon the irreversible change of the dimensional parameter of the outer periphery of the energy cell.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
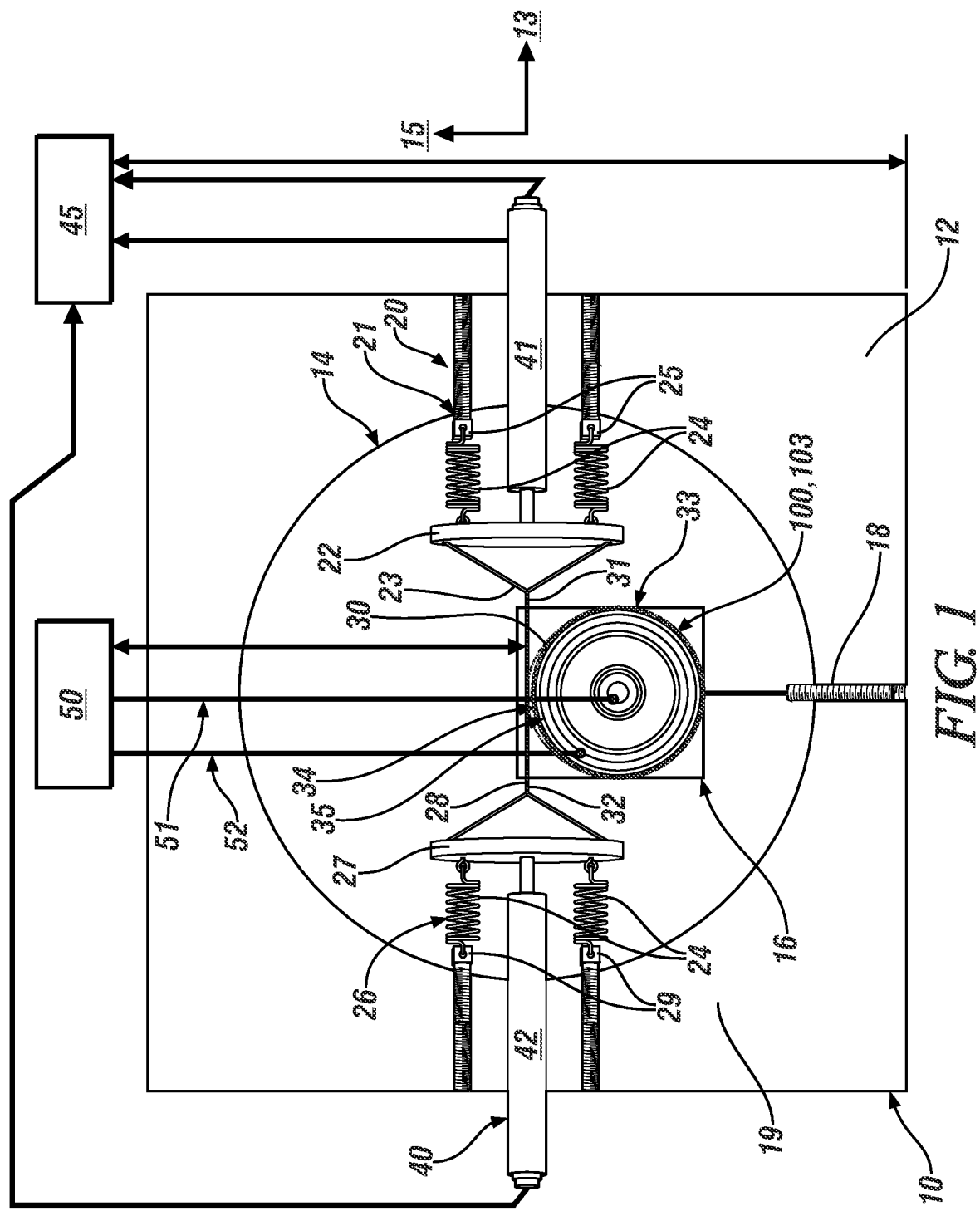
FIG. 1 schematically illustrates a top view of a dimensional measurement system for an energy cell, in accordance with the disclosure.

The appended drawings are not necessarily to scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure.

For purposes of the present description, unless specifically disclaimed, use of the singular includes the plural and vice versa, the terms "and" and "or" shall be both conjunctive and disjunctive, and the words "including," "containing," "having," and the like shall mean "including without limitation." Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The following detailed description is merely illustrative in nature and is not intended to limit the application and uses. Throughout the drawings, corresponding reference numerals indicate like or corresponding parts and features. Furthermore, there is no intention to be bound by an expressed or implied theory that may be presented herein. Furthermore, the disclosure, as illustrated and described herein, may be practiced in the absence of an element that is not specifically disclosed herein.

For purposes of convenience and clarity, directional terms such as top, bottom, left, right, up, over, above, below, beneath, rear, and front, and similar expressions are employed for description, and are not to be construed to limit the scope of the disclosure. The use of ordinals such as first, second and third does not imply a ranked sense of order, but rather may distinguish between multiple instances of an act or structure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Figure 2:
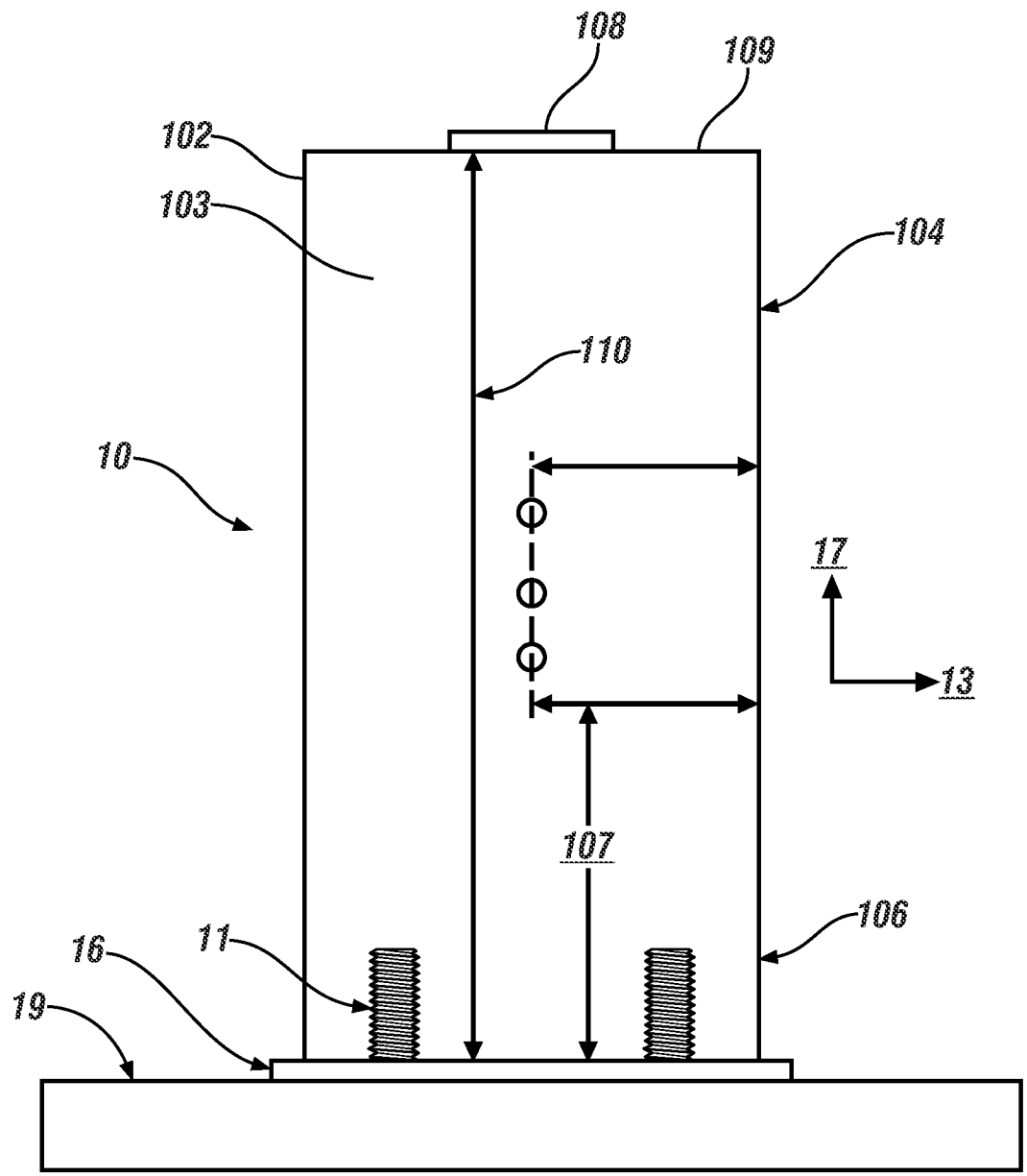
FIG. 2 schematically illustrates a side view of an energy cell that is disposed in an embodiment of a dimensional measurement system, in accordance with the disclosure.

Referring to the drawings, wherein like reference numerals correspond to like or similar components throughout the several Figures, FIGS. 1 and 2, consistent with embodiments disclosed herein, schematically illustrate a system 10 for an energy cell 100, wherein the system 10 is arranged in a thermally stable environment to monitor a dimensional parameter of the energy cell 100.

In one embodiment, the energy cell 100 is a rechargeable lithium-ion electrochemical battery that is composed of an internal portion that is disposed in a cylindrically-shaped outer shell or case 102. The internal portion includes first and second paired electrodes that are arranged in a stack and rolled into a cylindrical shape that is inserted into the case 102 and sealed therein. Alternatively, the energy cell 100 is a supercapacitor, or another electrical energy storage device. In one embodiment, the case 102 is configured as a hollow cylindrical tube having a top end 104 and a bottom end 106, wherein the case 102 defines an outer periphery 103 and a longitudinal axis 110. Alternatively, a cross-section of the case 102 may be configured as a squircle (rounded square), or have an oblong shape, or have another shape. In one embodiment, the case 102 is fabricated from metal, e.g., aluminum, aluminum alloy, steel, steel alloy, or another metal. Alternatively, the case 102 is fabricated from a polymeric material. The internal portion includes a positive electrode or cathode that electrically connects to a first terminal 108, and a negative electrode or anode that electrically connects to a second terminal 109. The first terminal 108 is separated from the second terminal 109 by an insulator.

The system 10 that is arranged to monitor a dimensional parameter of the energy cell 100 includes, in one embodiment, a wire cable 30, a cable tensioning system 20, and a measurement system 40 that are arranged in a main body 12. The system 10 also includes a cell fixturing element 11 for securing the energy cell 100. The system 10 may further include an electrical charge cycling system 50, which is connectable via a first cable and connector 51 to a first terminal 108 of the energy cell 100, and is connectable via a second cable and connector 52 to second terminal 109 of the energy cell 100.

The system 10 is shown resting on a platform 19.

The main body 12 is arranged as a solid rectangular prism that has a central, cylindrically shaped aperture 14, wherein the aperture 14 defines a first axis 13 and a second axis 15. A base portion 16 is arranged in the aperture 14, with one or multiple adjustment screw(s) 18 that connects the base portion 16 to the main body 12. The base portion 16 is moveable along the second axis 15 in relation to the main body 12 by manipulation of the adjustment screw(s) 18. Furthermore, the base portion 16 is moveable up or down along a third axis 17, wherein the third axis 17 is an elevation axis that corresponds to the longitudinal axis 110 of the energy cell 100.

The base portion 16 and one or multiple cell fixturing elements 11 (shown in FIG. 2) are arranged and employed to removably secure the energy cell 100 to the system 10. This arrangement, along with the manipulation of the adjustment screw(s) 18, is employed to arrange the energy cell 100 in relation to the wire cable 30 such that the wire cable 30 is tangential to the outer periphery 103 of the case 102 during measurement of the circumference of the energy cell 100, including after execution of a plurality of charge/discharge cycles by the electrical charge cycling system 50.

The wire cable 30 includes a first end 31, a second end 32, and a loop portion 33 interposed therebetween.

The wire cable 30 is fabricated from a material having low elasticity and a low coefficient of thermal expansion. In one embodiment, the wire cable 30 is fabricated from a nickel-iron alloy. In one embodiment, the wire cable 30 is fabricated from an invar alloy. In one embodiment, the wire cable 30 is an uninsulated single stranded wire having a circular or oval cross-sectional shape. In one embodiment, the wire cable 30 is a multi-stranded wire having a circular or oval cross-sectional shape.

The wire cable 30 is disposable about an outer periphery 103 of the energy cell 100, with the loop portion 33 being arrangeable around the outer periphery 103 of the case 102 of the energy cell 100.

The cable tensioning system 20 is arranged in the aperture 14, and includes a first tensioner 21 and a second tensioner 26 that are arranged in opposed positions within the aperture 14 on the first axis 13. The first tensioner 21 includes a first base 22 including a first centrally disposed tip portion 23, springs 24, and spring mounts 25. The second tensioner 26 includes a second base 27 including a second centrally disposed tip portion 28, springs 24, and spring mounts 29. The first centrally disposed tip portion 23 and the second centrally disposed tip portion 28 are advantageously arranged on the first axis 13.

The first end 31 of the wire cable 30 is affixed to the first centrally disposed tip portion 23 of the first tensioner 21, and the second end 32 of the wire cable 30 is affixed to the second centrally disposed tip portion 28 of the second tensioner 26.

The cable tensioning system 20 and the energy cell 100 are arranged such that the first tensioner 21 is arranged to exert a tensile force via the first end 31 of the wire cable 30 at a first tangent 34 to the energy cell 100 and the second tensioner 26 is arranged to exert a tensile force via the second end 32 of the wire cable 30 at a second tangent 35 to the energy cell 100 when the wire cable 30 is disposed around the outer periphery 103 of the energy cell 100.

The measurement system 40 includes a first linear displacement transducer 41 and a second linear displacement transducer 42. The first linear displacement transducer 41 and the second linear displacement transducer 42 are arranged and aligned on the first axis 13. The first linear displacement transducer 41 is affixed to the first base 22 of the first tensioner 21, and the second linear displacement transducer 42 is affixed to the second base 27 of the second tensioner 26. The first linear displacement transducer 41 and the second linear displacement transducer 42 are in communication with a controller 45.

The measurement system 40 operates in conjunction with the cable tensioning system 20 to determine a dimensional parameter, e.g., an outer circumference, of the energy cell 100 when the first tensioner 21 exerts a tensile force via the first end 31 of the wire cable 30 at a tangent to the energy cell 100 and the second tensioner 26 exerts a tensile force via the second end 32 of the wire cable 30 at a tangent to the energy cell 100 when the wire cable 30 is disposed around the outer periphery 103 of the energy cell 100.

Furthermore, by having the base portion 16 moveable up or down along the third axis 17, the cable tensioning system 20 and measurement system 40 are arrangeable on the energy cell 100 at a selectable z-height, wherein the z-height is definable relative to the third axis 17, i.e., the elevation axis. Thus, the measurement system 40 operates in conjunction with the cable tensioning system 20 to determine a dimensional parameter, e.g., an outer circumference, of the energy cell 100 at the selectable z-height.

The electrical charge cycling system 50 advantageously includes an electrical charge source and an electrical charge sink, and may be employed to cyclically charge and discharge the energy cell 100 between a maximum state of charge and a minimum state of charge, for purposes of exercising the energy cell 100, as part of a testing regimen.

This arrangement enables the energy cell 100 to be securable by the cell fixturing element 11 in the system 10, and the cable tensioning system 20 and measurement system 40 to be arrangeable on the energy cell 100 at a selectable z-height 107, wherein the z-height 107 is definable relative to the third axis 17, i.e., the elevation axis. As such, the cable tensioning system 20 and measurement system 40 are arrangeable on the energy cell 100 at or near a bottom portion, at various z-heights in a middle portion, and/or at or near a top portion of the energy cell 100 to determine a dimensional parameter of the outer periphery thereof, e.g., an outer circumference, including conducting such measurements before, during, and after a charging event and/or a discharging event by the electrical charge cycling system 50.

By way of a non-limiting example, the measurement system 40 in conjunction with the cable tensioning system 20 may be employed to determine a first circumference of the energy cell 100 at a selected z-height 107 when the energy cell 100 is at a 0% state of charge (SOC) point, and determine a second circumference of the energy cell 100 when the energy cell 100 has been charged to a second SOC point, e.g., at a 100% SOC point, by operation of the electrical charge cycling system 50. A difference between the first circumference and the second circumference may be determined.

Furthermore, the measurement system 40 in conjunction with the cable tensioning system 20 may be employed to determine a circumference of the energy cell 100 after execution of a plurality of charge/discharge cycles by the electrical charge cycling system 50.

A method for monitoring a dimensional parameter, e.g., a circumference, for an embodiment of the energy cell 100 described herein includes securing the energy cell 100 into the cell fixturing element 11, which is arranged in a thermally stable environment. Wire cable 30 is arranged in the loop portion 33 being looped around an outer periphery 103 of the case 102 of the energy cell 100, and is attached to first and second bases 22, 27 of respective first and second tensioners 21, 26 of tensioning system 20. The first and second bases 22, 27 of the tensioning system 20 are also attached to the measurement system 40.

First and second terminals 108, 109 of the energy cell 100 are electrically connected to electrical charge cycling system 50. The electrical charge cycling system 50 executes one or multiple charge/discharge cycles on the energy cell and coincidently monitors, via the measurement system 40, a dimensional parameter of the outer periphery of the energy cell 100. In one embodiment, the dimensional parameter of the outer periphery of the energy cell 100 is an outer circumference.

The charge/discharge cycle may include initially discharging the energy cell 100 to a 0% SOC point, charging the energy cell 100 to a 100% SOC point, and then discharging the energy cell to the 0% SOC point. During the charge/discharge cycle, the measurement system 40 in conjunction with the cable tensioning system 20 may be employed to determine a circumference of the energy cell 100 at a selected z-height 107 when the energy cell 100 is at a 0% state of charge (SOC) point, determine the circumference of the energy cell 100 when the energy cell 100 has been charged to a second SOC point, e.g., at a 100% SOC point, by operation of the electrical charge cycling system 50, and then determine the circumference of the energy cell 100 at the selected z-height 107 when the energy cell 100 is at the 0% state of charge (SOC) point after discharging.

Figure 3:
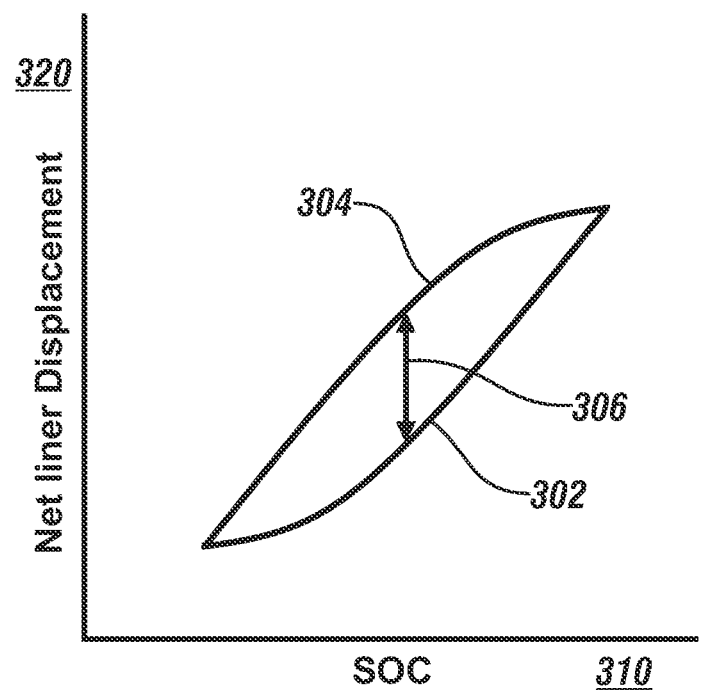
FIG. 3 graphically illustrates a relationship between state of charge (SOC) and a dimensional parameter for the outer periphery of an energy cell during a single charging/discharging cycle, in accordance with the disclosure.

FIG. 3 graphically illustrates a relationship between SOC 310 (shown on horizontal axis) and the dimensional parameter 320 of the outer periphery of the energy cell 100 (shown on vertical axis) during charging 302 and during discharging 304, with hysteresis 306 also being indicated.

Figure 4:
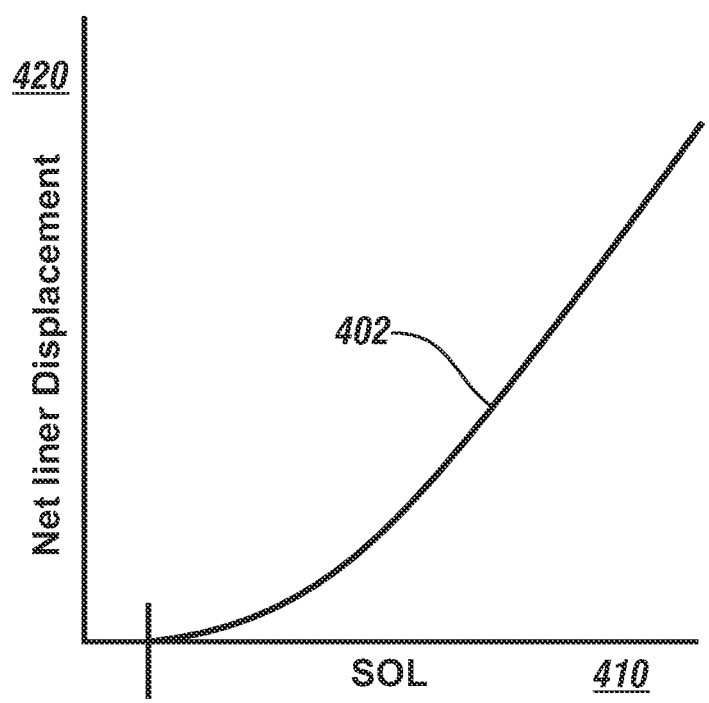
FIG. 4 graphically illustrates a relationship between a state of life (SOL) and a net linear displacement or irreversible change in a dimensional parameter of the outer periphery of the energy cell after execution of repeated charging/discharging cycles, in accordance with the disclosure.

FIG. 4 graphically illustrates a relationship 402 between a state of life (SOL) 410 and a net linear displacement 420 (or irreversible change in the dimensional parameter of the outer periphery of the energy cell 100) after repeated charging and discharging cycles. The relationship 402 indicates that initially the net linear displacement 420 (or irreversible change in the dimensional parameter of the outer periphery of the energy cell 100) is unchanged during repeated charging and discharging cycles, but after a quantity of charge/discharge cycles indicated by 404, there is an irreversible change in the dimensional parameter of the outer periphery of the energy cell 100. This information may be employed to determine an intercalation induced volume change for the energy cell based upon the reversible change of the dimensional parameter of the outer periphery of the energy cell. This information may also be employed to determine a side reaction induced volume change based upon the irreversible change of the dimensional parameter of the outer periphery of the energy cell, employing known methodologies.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. Alternative or additional functional relationships or physical connections may be present in an embodiment of the present disclosure.

The term "controller" and related terms such as microcontroller, control, control unit, processor, etc., refer to one or multiple combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter may be a discrete value (e.g., either "1" or "0"), a percentage (e.g., 0% to 100%), or an infinitely variable value.

The term "model" refers to a processor-based or processor-executable code and associated calibration that simulates a physical existence of a device or a physical process.

The detailed description and the drawings or figures are supportive and descriptive of the present teachings, but the scope of the present teachings is defined solely by the claims. While some of the best modes and other embodiments for carrying out the present teachings have been described in detail, various alternative embodiments exist for practicing the present teachings defined in the claims.

What is claimed is:

1. A system for an energy cell, the system comprising:
   a wire cable, wherein the wire cable includes a first end and a second end, and wherein the wire cable is disposable about an outer periphery of an energy cell;
   a tensioning system, including a first tensioner attached to a first end of the wire cable and a second tensioner attached to a second end of the wire cable; and
   a measurement system, including a first linear displacement transducer and a second linear displacement transducer in communication with a controller;
   wherein the wire cable is looped around the energy cell;
   wherein the first linear displacement transducer is connected to the first tensioner, and wherein the second linear displacement transducer is connected to the second tensioner; and
   wherein the measurement system is operative to determine a dimensional parameter of the energy cell.

2. The system of claim 1, wherein the measurement system is operative to determine a length of the outer periphery of the energy cell.

3. The system of claim 1, further comprising:
   a charge cycling system;
   wherein the charge cycling system is connectable to the energy cell.

4. The system of claim 3:
   wherein the charge cycling system is operative to execute a charge/discharge cycle on the energy cell; and
   wherein the measurement system is operative to determine the dimensional parameter of the outer periphery of the energy cell coincident with the charge cycling system executing the charge/discharge cycle on the energy cell.

5. The system of claim 4, wherein the energy cell has a cylindrical configuration;
   wherein the measurement system is operative to determine a circumference of the energy cell based upon a linear displacement of the wire cable that is determined via the first linear displacement transducer and the second linear displacement transducer.

6. The system of claim 5, wherein the measurement system is operative to:
   determine a first circumference of the energy cell at a 0% state of charge (SOC) point;
   determine a second circumference of the energy cell at a second SOC point; and
   determine a difference between the first circumference and the second circumference.

7. The system of claim 1, wherein the tensioner system is arranged such that the first tensioner is arranged to exert a tensile force via the first end of the wire cable at a tangent to the energy cell and the second tensioner is arranged to exert a tensile force via the second end of the wire cable at a tangent to the energy cell when the wire cable is disposed around the outer periphery of the energy cell.

8. The system of claim 1:
   wherein the energy cell defines an elevation axis; and
   wherein the tensioning system is arrangeable on the energy cell at a z-height, wherein the z-height is definable relative to the elevation axis.

9. The system of claim 1, wherein the wire cable is fabricated from a nickel-iron alloy, including an invar alloy.

10. The system of claim 1, wherein the wire cable being disposable about an outer periphery of the energy cell comprises the wire cable being loopable around the outer periphery of the energy cell.

11. A system for an energy cell, the system comprising:
    a tensioning system including a wire cable, a measurement system, and a charge cycling system arranged in a thermally stable environment;
    wherein the wire cable is disposable about an outer periphery of an energy cell;
    wherein the tensioning system includes a first tensioner attached to a first end of the wire cable and a second tensioner attached to a second end of the wire cable;
    wherein the measurement system includes a first linear displacement transducer and a second linear displacement transducer in communication with a controller;
    wherein the charge cycling system is connectable to the energy cell;
    wherein the first linear displacement transducer is connected to the first tensioner; and
    wherein the second linear displacement transducer is connected to the second tensioner.

12. The system of claim 11, wherein the measurement system is operative to determine a length of the outer periphery of the energy cell that corresponds to a dimensional parameter of the energy cell.

13. The system of claim 12:
    wherein the charge cycling system is operative to execute a charge/discharge cycle on the energy cell; and
    wherein the measurement system is operative to determine the dimensional parameter of the outer periphery of the energy cell coincident with the charge cycling system executing the charge/discharge cycle on the energy cell.

14. The system of claim 13, wherein the energy cell has a cylindrical configuration; and wherein the measurement system is operative to determine a circumference of the energy cell based upon a linear displacement of the wire cable that is determined via the first linear displacement transducer and the second linear displacement transducer.

15. The system of claim 11, wherein the measurement system is operative to:
    determine a first circumference of the energy cell at a 0% state of charge (SOC) point;
    determine a second circumference of the energy cell at a second SOC point; and
    determine a difference between the first circumference and the second circumference.

16. The system of claim 11:
    wherein the energy cell defines an elevation axis; and
    wherein the tensioning system is arrangeable on the energy cell at a z-height, wherein the z-height is definable relative to the elevation axis.

17. The system of claim 11, wherein the wire cable is fabricated from a nickel-iron alloy including an invar alloy.

18. A method for monitoring a dimensional parameter for an energy cell, the method comprising:

securing an energy cell into a fixture that is arranged in a thermally stable environment;
arranging a wire cable in a loop around an outer periphery of the energy cell;
attaching the wire cable to a base of a tensioning system;
attaching the base of the tensioning system to a measurement system; and
executing, via a charge cycling system, a charge/discharge cycle on the energy cell and coincidently monitoring, via the measurement system, a dimensional parameter of the outer periphery of the energy cell.

19. The method of claim 18, further comprising:
determining a reversible change of the dimensional parameter of the outer periphery of the energy cell during execution of the charge/discharge cycle on the energy cell; and
determining an irreversible change of the dimensional parameter of the outer periphery of the energy cell during execution of the charge/discharge cycle on the energy cell.

20. The method of claim 19, further comprising:
determining an intercalation induced volume change for the energy cell based upon the reversible change of the dimensional parameter of the outer periphery of the energy cell; and
determining a side reaction induced volume change based upon the irreversible change of the dimensional parameter of the outer periphery of the energy cell.

* * * * *